(12) United States Patent
Ohba

(10) Patent No.: US 6,771,277 B2
(45) Date of Patent: Aug. 3, 2004

(54) IMAGE PROCESSOR, IMAGE PROCESSING METHOD, RECORDING MEDIUM, COMPUTER PROGRAM AND SEMICONDUCTOR DEVICE

(75) Inventor: Akio Ohba, Kanagawa (JP)

(73) Assignee: Sony Computer Entertainment Inc. (JP)

( * ) Notice: Subject to any disclaimer, the term of this patent is extended or adjusted under 35 U.S.C. 154(b) by 328 days.

(21) Appl. No.: 09/971,962

(22) Filed: Oct. 5, 2001

(65) Prior Publication Data

US 2002/0097247 A1 Jul. 25, 2002

(30) Foreign Application Priority Data

Oct. 6, 2000 (JP) ........................................ 2000-307574
Sep. 26, 2001 (JP) ........................................ 2001-295098

(51) Int. Cl.[7] ............................. G09G 5/377; G06F 3/14
(52) U.S. Cl. ...................... 345/629; 345/634; 345/156; 345/863
(58) Field of Search ................................ 345/629, 634, 345/638, 156, 157, 863

(56) References Cited

U.S. PATENT DOCUMENTS 5,261,041 A * 11/1993 Susman ........................ 345/473
5,594,469 A 1/1997 Freeman et al.
5,732,227 A 3/1998 Kuzunuki et al.
6,072,494 A * 6/2000 Nguyen ........................ 345/863
6,088,018 A * 7/2000 DeLeeuw et al. ........... 345/629
6,160,899 A * 12/2000 Lee et al. .................... 345/863

FOREIGN PATENT DOCUMENTS

JP   6-153017 A   5/1994
JP   7-281666 A   10/1995

OTHER PUBLICATIONS

Animated Cursor Pointer, May 1, 1992, IBM Technical Disclosure Bulletin, vol. 34, issue No. 12, pp. 209–210.*

* cited by examiner

Primary Examiner—Jeffery Brier
(74) Attorney, Agent, or Firm—Lerner, David, Littenberg, Krumholz & Mentlik, LLP

(57) ABSTRACT

The present invention provides an image processor to use images taken by an image pickup device, etc. as an input interface to enter commands, etc. The present invention provides an image processor that includes image capturing means for capturing a mirrored moving image partially including a moving target, image generating means for generating an object image expressing a predetermined object according to the movement of the target included in the mirrored moving image captured by the image capturing means and controlling means for combining the object image generated by this image generating means with the captured mirrored moving image and displaying the combined image on a predetermined display device.

21 Claims, 11 Drawing Sheets

IMAGE PROCESSOR, IMAGE PROCESSING METHOD, RECORDING MEDIUM, COMPUTER PROGRAM AND SEMICONDUCTOR DEVICE

CROSS-REFERENCE TO RELATED APPLICATIONS

This application is based upon and claims the benefit of priority from the prior Japanese Patent Applications Nos. 2000-307574, filed Oct. 6, 2000, and 2001-295098 filed Sep. 26, 2001, the entire contents of both of which are incorporated herein by reference.

BACKGROUND OF THE INVENTION

The present invention relates to an image processing technology for using an image taken by an image pickup apparatus such as a video camera as an interface for inputting commands, etc.

A keyboard, mouse, controller, etc. are input devices often used for a computer, video game machine, etc. The operator inputs desired commands by operating these input devices to render a computer, etc. to execute processing according to the commands entered. Then, the operator sees images and listens to sound, etc. obtained as the processing results from a display device and speaker.

The operator enters commands by operating many buttons provided on the input device while watching a cursor shown on the display device.

Such operations greatly depend on operating experiences of the operator. For example, for a person who never touched the keyboard before, entering desired commands using the keyboard is quite troublesome and time-consuming, and prone to input errors due to mistyping from the keyboard. For this reason, there is a demand for a man-machine interface that will provide the operator with an easy way to operate.

On the other hand, with the progress of multimedia technologies, people in general households can now readily enjoy capturing images using a video camera into a computer, etc., editing and displaying the images on a display device. Such technologies are also used for personal authentication by analyzing images of a physical body such as a face, extracting characteristic parts thereof to identify individuals.

Conventionally, these images are used as information to be processed by a computer such as editing or analysis. However, images taken have not been used so far for a purpose such as entering commands to a computer, for example.

SUMMARY OF THE INVENTION

It is an object of the present invention to provide an image processing technology to use images taken by an image pickup apparatus, etc. as an input interface to enter commands, etc.

An image processor according to the present invention to solve the above-described problems comprises image capturing means for capturing a mirrored moving image partially including a moving target, image generating means for generating an object image expressing a predetermined object according to the movement of the target included in the mirrored moving image captured by the image capturing means and controlling means for combining the object image generated by this image generating means with the captured mirrored moving image and displaying the combined image on a predetermined display device.

The "target" refers to a remarked part of an object (person or matter, etc.) whose image is taken by an image pickup apparatus that supplies the image to an image processor.

Another image processor according to the present invention comprises image capturing means for capturing a mirrored moving image partially including a moving target, detecting means for detecting the target and the movement component thereof by detecting image features between the mirrored moving image at the actual time point and the immediately preceding mirrored moving image, image generating means for generating an object image expressing a predetermined object in such a way as to change according to the movement component of the target detected by the detecting means and controlling means for combining the object image generated by this image generating means with the captured mirrored moving image and displaying the combined image on a predetermined display device.

These image processors generate object images according to the movements of targets included in the mirrored moving image. That is, the movement, color, shape of the object image to be displayed on the display device and if there is a plurality of object images, which object image should be displayed, etc. are determined by the movement of the target. For example, if the target is the operator, the object is determined according to the movement of the operator. Thus, the mirrored moving image is available as a kind of input interface.

In these image processors, it is also possible to construct the image generating means to generate the object image in such a way as to follow the movement of the detected target.

It is also possible to comprise means for making preparations for executing required processing based on the generated object image according to the movement component of the target.

It is also possible to further comprise means for comparing a combined image obtained by combining the object image generated by the image generating means and the mirrored moving image at the actual time point, with a template image which is the image of part of the target included in the immediately preceding mirrored moving image, detecting the part of the combined image whose image feature is most resembling the template image and making preparations for executing required processing based on this object image when the image of the part of the detected combined image includes the object image.

By associating the object image with predetermined processing and further comprising means for executing the processing linked to the object image when the movement component of the target detected by the detecting means satisfies predetermined conditions, it is possible to execute processing using the movement of the target as an input.

It is also possible to construct the image processor so that the mirrored moving image includes a plurality of targets, construct the detecting means to detect the movement components of the plurality of targets and detect one target based on the respective movement components of the detected plurality of targets, construct the image generating means to change the object image according to the movement component of the one target detected by the detecting means.

The present invention further provides the following image processing method. This image processing method comprises the steps of capturing a mirrored moving image partially including a moving target in the image processor, generating an object image expressing a predetermined object using the image processor according to the movement of the target included in the captured mirrored moving image and combining the object image generated with the captured mirrored moving image and displaying the combined image on a predetermined display device.

The present invention also provides the computer program. This computer program renders a computer with a display device connected thereto to execute the steps of capturing a mirrored moving image partially including a moving target, generating an object image expressing a predetermined object according to the movement of the target included in the captured mirrored moving image and combining the object image generated with the captured mirrored moving image and displaying the combined image on the display device.

The present invention also provides the semiconductor device. This semiconductor device renders a computer with a display device connected thereto to form the functions of means for capturing a mirrored moving image partially including a moving target, means for generating an object image expressing a predetermined object according to the movement of the target included in the captured mirrored moving image and means for combining the object image generated with the captured mirrored moving image and displaying the combined image on the display device.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

An embodiment of the present invention will be specifically described with reference to the drawings accompanying herewith.

Figure 1:
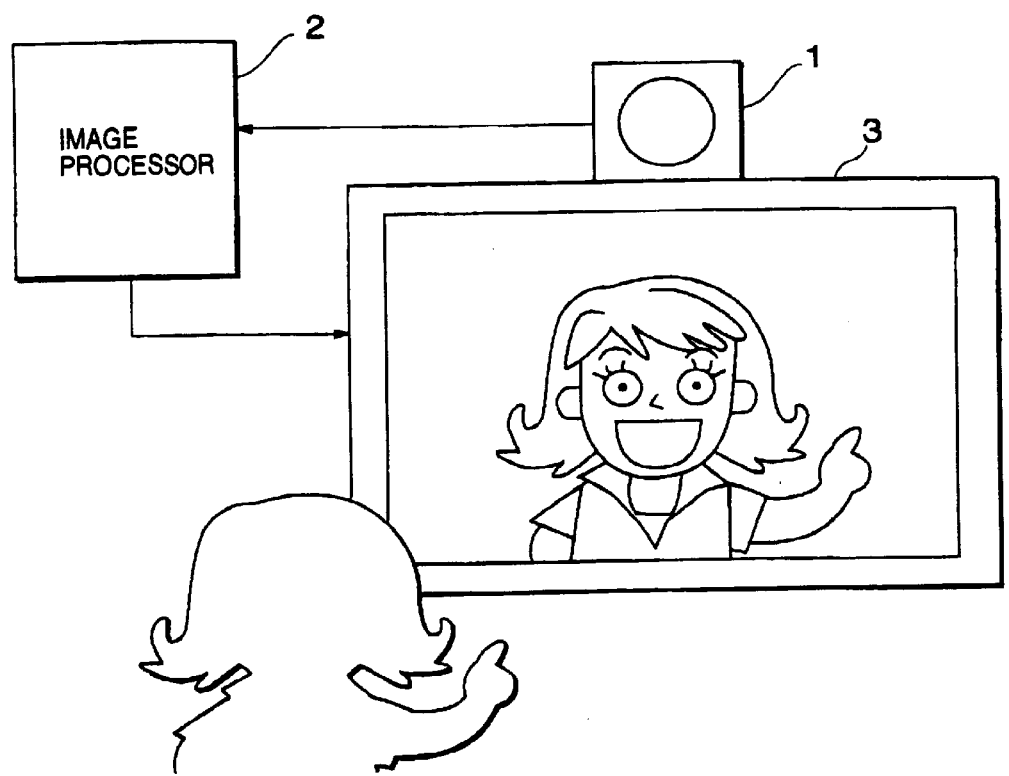
FIG. 1 is an overall configuration diagram of an image processing system applying the present invention.

FIG. 1 is a configuration example of an image processing system applying the present invention.

This image processing system takes pictures of the operator who sits in front of a display device 3 using an analog or digital video camera 1. In this way, the image processing system captures moving images into an image processor 2 consecutively in a time series to generate mirrored moving images. Of these mirrored moving images, the image processing system combines object images expressing objects such as a menu and cursor at positions where remarked objects such as the eyes and hands of the operator (hereinafter the remarked objects are referred to as "targets") to generate a combined image (this, too, becomes a moving image) and displays this combined image on the display device 3 in real time.

A mirrored moving image can be generated by subjecting the moving image captured from the video camera 1 to mirroring (right/left inversion of image) by the image processor 2, but it is also possible to place a mirror in front of the video camera 1 and take pictures of a moving image on the mirror surface reflecting the operator by the video camera 1 to form a mirrored moving image. In any case, a combined image whose display mode changes in real time according to the movement of the target is displayed on the display device 3.

The image processor 2 is implemented by a computer that forms the required functions using a computer program.

Figure 2:
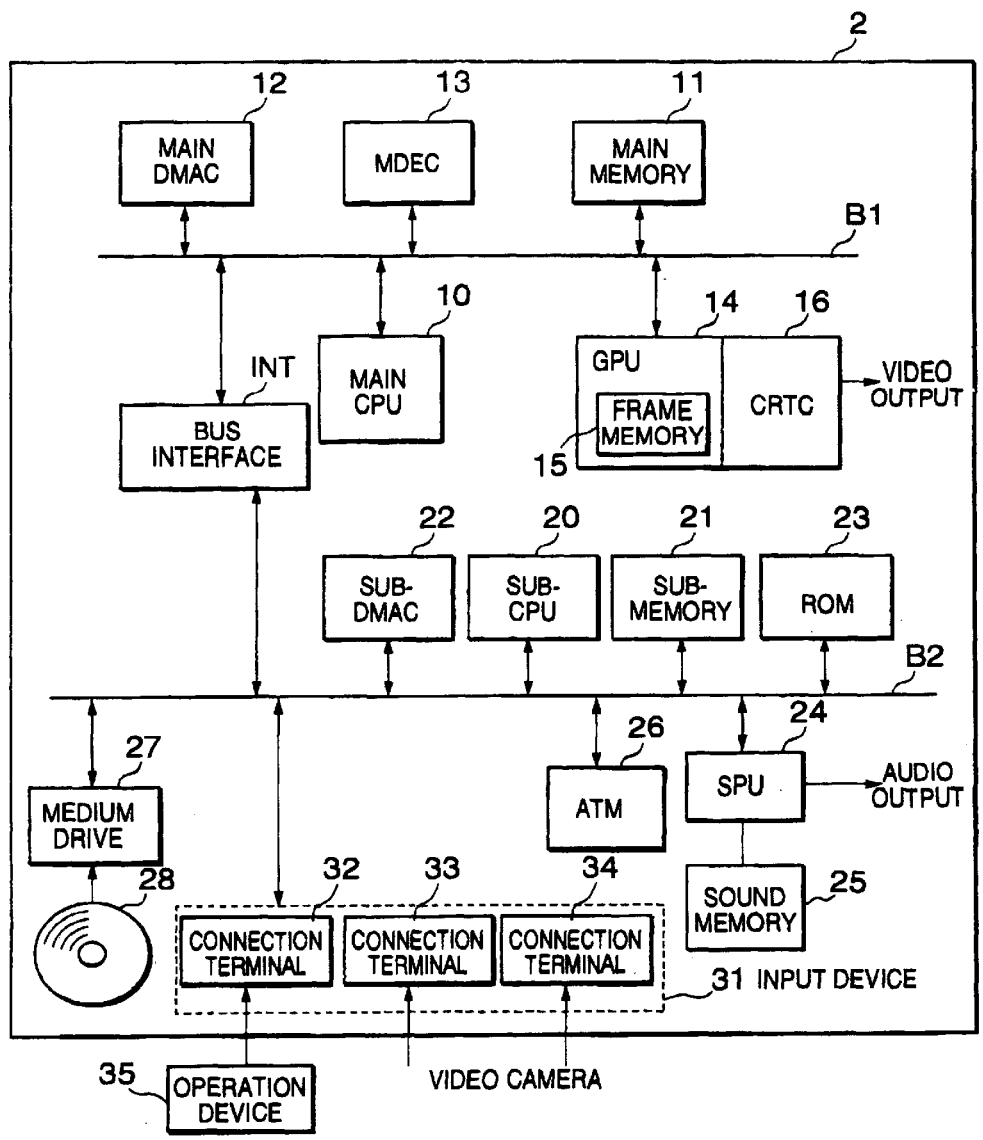
FIG. 2 is a configuration diagram of an image processor according to an embodiment of the present invention.

The computer according to this embodiment whose hardware configuration is shown by way of example in FIG. 2 has two buses; a main bus B1 and sub bus B2 to which a plurality of semiconductor devices each having specific functions is connected. These buses B1 and B2 are mutually connected or disconnected via a bus interface INT.

The main bus B1 is connected to a main CPU 10 which is a main semiconductor device, a main memory 11 made up of a RAM, a main DMAC (Direct Memory Access Controller) 12, an MPEG (Moving Picture Experts Group) decoder (MDEC) 13 and a graphic processing unit (hereinafter referred to as "GPU") 14 incorporating a frame memory 15 which serves as a drawing memory. The GPU 14 is connected with a CRTC (CRT controller) 16 for generating a video signal so as to display the data drawn in the frame memory 15 on the display device 3.

The CPU 10 loads a start program from the ROM 23 on the sub bus B2 at the startup via the bus interface INT, executes the start program and operates an operating system. The CPU 10 also controls the media drive 27, reads an application program or data from the medium 28 mounted in this media drive 27 and stores this in the main memory 11. The CPU 10 further applies geometry processing (coordinate value calculation processing) to various data read from the medium 28, for example, three-dimensional object data (coordinate values of vertices (typical points) of a polygon, etc.) made up of a plurality of basic graphics (polygons) and generates a display list containing geometry-processed polygon definition information (specifications of shape of the polygon used, its drawing position, type, color or texture, etc. of components of the polygon).

The GPU 14 is a semiconductor device having the functions of storing drawing context (drawing data including polygon components), carrying out rendering processing (drawing processing) by reading necessary drawing context according to the display list notified from the main CPU 10 and drawing polygons in the frame memory 15. The frame memory 15 can also be used as a texture memory. Thus, a pixel image in the frame memory can be pasted as texture to a polygon to be drawn.

The main DMAC 12 is a semiconductor device that carries out DMA transfer control over the circuits connected to the main bus B1 and also carries out DMA transfer control over the circuits connected to the sub bus B2 according to the condition of the bus interface INT. The MDEC 13 is a semiconductor device that operates in parallel with the CPU 10 and has the function of expanding data compressed in MPEG (Moving Picture Experts Group) or JPEG (Joint Photographic Experts Group) systems, etc.

The sub bus B2 is connected to a sub CPU 20 made up of a microprocessor, etc., a sub memory 21 made up of a RAM, a sub DMAC 22, a ROM 23 that records a control program such as operating system, a sound processing semiconductor device (SPU: Sound Processing Unit) 24 that reads sound data stored in the sound memory 25 and outputs as audio output, a communication control section (ATM) 26 that transmits/receives information to/from an external apparatus via a network (not shown), a media drive 27 for accepting a medium 28 such as CD-ROM and DVD-ROM and an input device 31.

The sub CPU 20 carries out various operations according to the control program stored in the ROM 23. The sub DMAC 22 is a semiconductor device that carries out control such as a DMA transfer over the circuits connected to the sub bus B2 only when the bus interface INT separates the main bus B1 from sub bus B2. The input unit 31 is provided with a connection terminal 32 through which an input signal from an operating device 35 is input, a connection terminal 33 through which an image signal from a video camera 1 is input and a connection terminal 34 through which a sound signal from the video camera 1 is input.

This Specification will only explain about images and omit explanations of sound for convenience.

Figure 3:
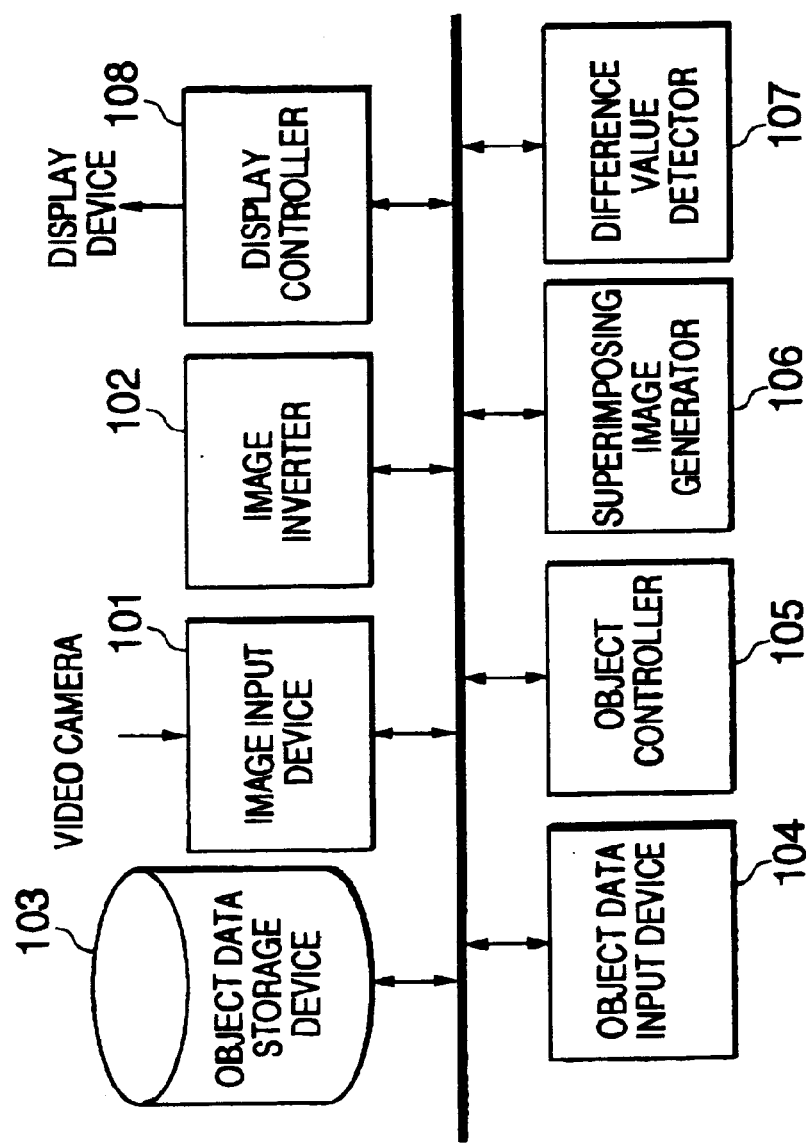
FIG. 3 is a functional block diagram of the image processor according to the embodiment of the present invention.

In the computer constructed as shown above, and with reference to FIG. 3, the main CPU 10, sub CPU 20 and GPU 14 read and execute a predetermined computer program from the recording medium such as the ROM 23 and medium 28, and thereby form a functional block necessary for operating as the image processor 2, that is, an image input device 101, an image inverter 102, an object data storage device 103, an object data input device 104, an object controller 105, a superimposing image generator 106, a difference value detector 107 and a display controller 108.

In the relationship with the hardware shown in FIG. 1, the image input device 101 is formed by the input device 31 and the sub CPU 20 that controls the operation thereof, the image inverter 102, the object data input device 104, the object controller 105 and the difference value detector 107 are formed by the CPU 10 and the superimposing image generator 106 are formed by the GPU 104, and the display controller 108 is formed by the GPU 14 and CRTC 16 cooperating with each other. The object data storage device 103 is formed in a memory area accessible to the main CPU 10, for example, the main memory 11.

The image input device 101 incorporates images taken by the video camera 1 via the connection terminal 33 of the input device 31. In the case where the image entered is a digital image, the image input device 101 incorporates the image as is. In the case where the image taken and entered is an analog image, the image input device 101 incorporates the image after converting it from analog to digital.

The image inverter 102 subjects the image incorporated by the image input device 101 to mirroring, that is, right/left inversion to form a mirrored moving image.

The object data storage device 103 stores object data to express objects such as a menu (including a submenu), matchstick, cursor together with identification data thereof.

The object data input device 104 incorporates necessary object data from the object data storage device 103 and sends the object data to the object controller 105. The object data to be incorporated is instructed by the object controller 105.

The object controller 105 generates an object image based on the object data incorporated from the object data input section 104 according to the instruction content. Especially, the object controller 105 determines the object display condition based on a difference value sent from the difference value detector 107 and generates an object image to realize the display condition. The difference value will be described later.

The superimposing image generator 106 draws a combined image obtained by superimposing the mirrored moving image output from the image inverter 102 on the object image generated by the object controller 105 in the frame memory 15.

By the way, in addition to generating a combined image by superimposing the object image, it is also possible to display the object image on the mirrored moving image using publicly known imposing processing.

The difference value detector 107 compares the image features of the mirrored moving image of the combined image generated by the superimposing image generator 106 frame by frame and derives the difference value of the image features between the mirrored moving images of the preceding and following frames. Furthermore, the difference value detector 107 generates a difference image between the mirrored moving images of the preceding and following frames as required.

The difference value in the image features is a value quantitatively expressing a variation per frame of the movement component of the target included in the mirrored moving image. For example, the difference value indicates a distance that the target has moved in the mirrored moving image or an area between the area after the movement and the area before the movement.

When a plurality of targets is included within one mirrored moving image, a difference value in the image features expresses a variation in the movement of each target, and therefore it is possible to quantitatively calculate the variation in the movement of each target by calculating this difference value.

The difference image is an image expressing a variation in the movement per frame of each target included in the mirrored moving image at every point in time. For example, when a target moves between two mirrored moving images, the difference image is an image made up of the image of the target before the movement and the image of the target after the movement.

In order to derive the difference value and difference image, the difference value detector 107 stores a certain mirrored moving image as a "reference image" relative to mirrored moving images of other frames in the main memory 11. The mirrored moving image to be stored may be a full one-frame worth mirrored moving image or may be a mirrored moving image that is only part of the target because all that is required is to make it possible to derive a difference value in the image features.

In the following explanations, whenever a distinction should be made between an image of part of a target and an image of the rest of the target, such an image is called "template image".

The difference value detected by the difference value detector 107 is sent to the object controller 105 and used to control movements of object images.

The display controller 108 converts the combined image generated by superimposing image generator 106 to a video signal and outputs the video signal to the display device 3. The display device 3 displays the combined image (moving image) on a screen using this video signal.

Image Processing Method

An embodiment of the image processing method carried out using the above-described image processing system will now be explained.

Embodiment 1

Figure 6:
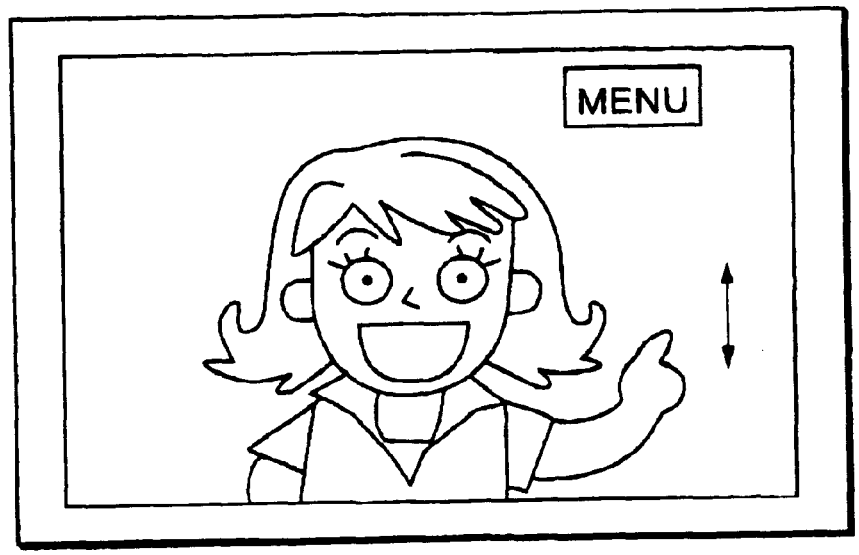
FIG. 6 illustrates a combined image according to Embodiment 1.

On the display device 3, as shown in FIG. 6, suppose the image processor 2 displays a combined image consisting of the mirrored moving image of the operator taken by the video camera 1 and subjected to mirroring with a menu image as an example of an object image superimposed.

As a target, it is possible to select various objects such as the eyes, mouth, hands, etc. of the operator. Here, a case will be described where the operator's hand is the target and instructions are entered to the menu image by detecting the amount of movement of the hand in the area in which the menu image is displayed.

Figure 7:
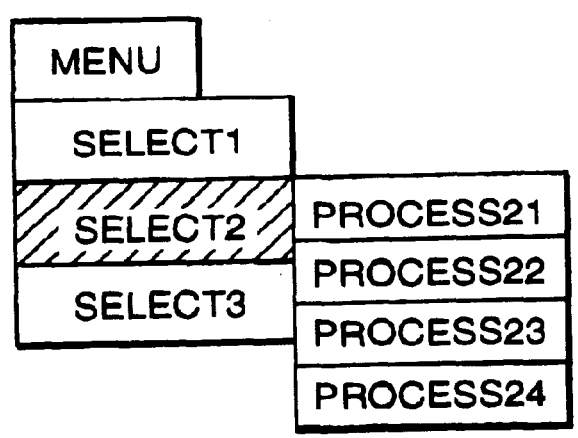
FIG. 7 illustrates a menu image.

The menu image has a hierarchic structure as shown in FIG. 7. When the operator selects "menu" at the top layer, a pull-down image highlighting one of "select1", "select2" or "select3" at the lower layer is displayed and when one item is selected from the pull-down image, the process determining image (for example, "process 21", "process 22", "process 23", "process 24") of the menu at the lower layer of the selected pull-down image are displayed.

The process determining image is stored in the object data storage device 103 linked to the program to render the main CPU 10 to execute the determined process (event) and when a certain process determining image is selected, the program linked thereto starts to execute the corresponding process (event).

Figure 4:
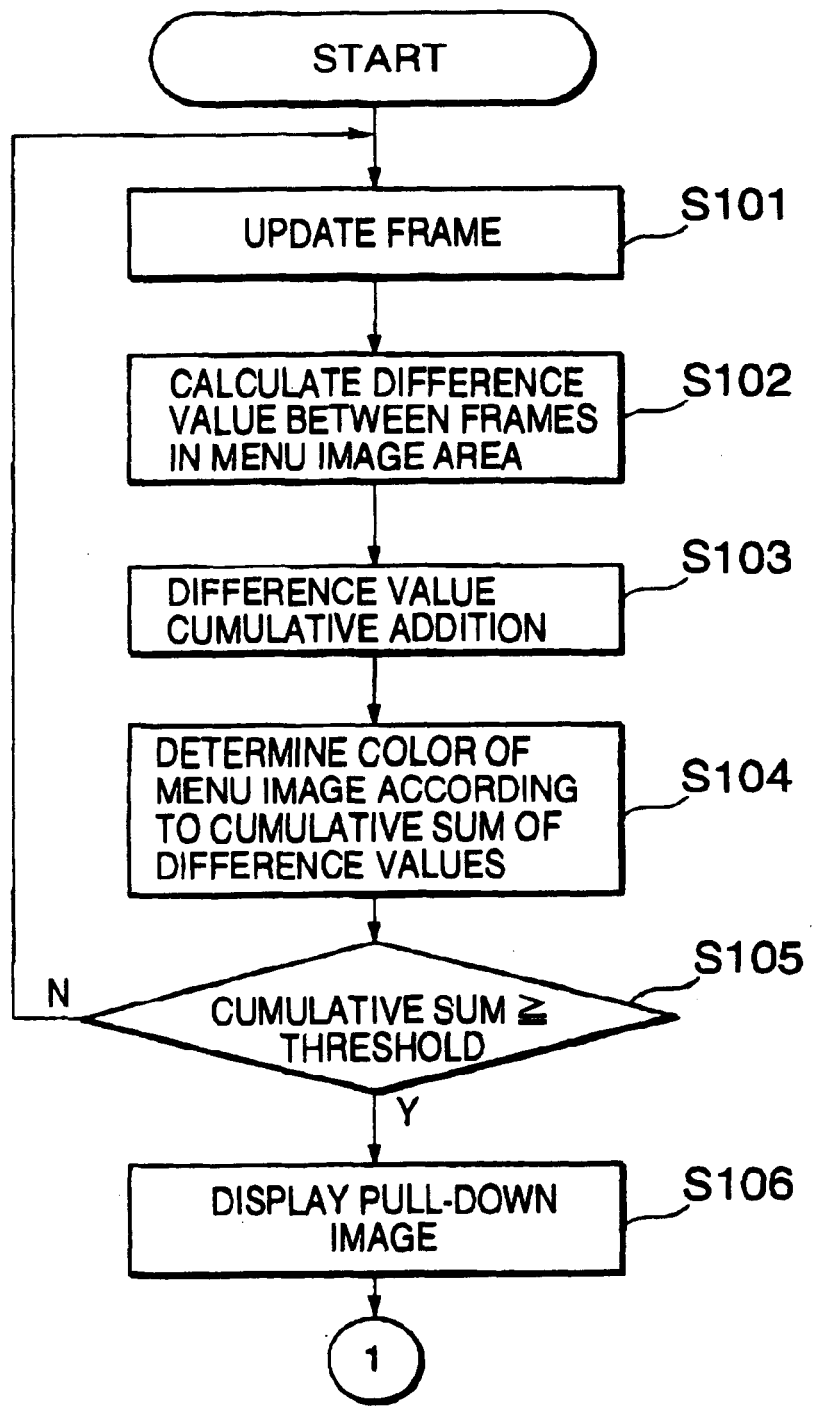
FIG. 4 is a flow chart showing a processing procedure of Embodiment 1.
Figure 5:
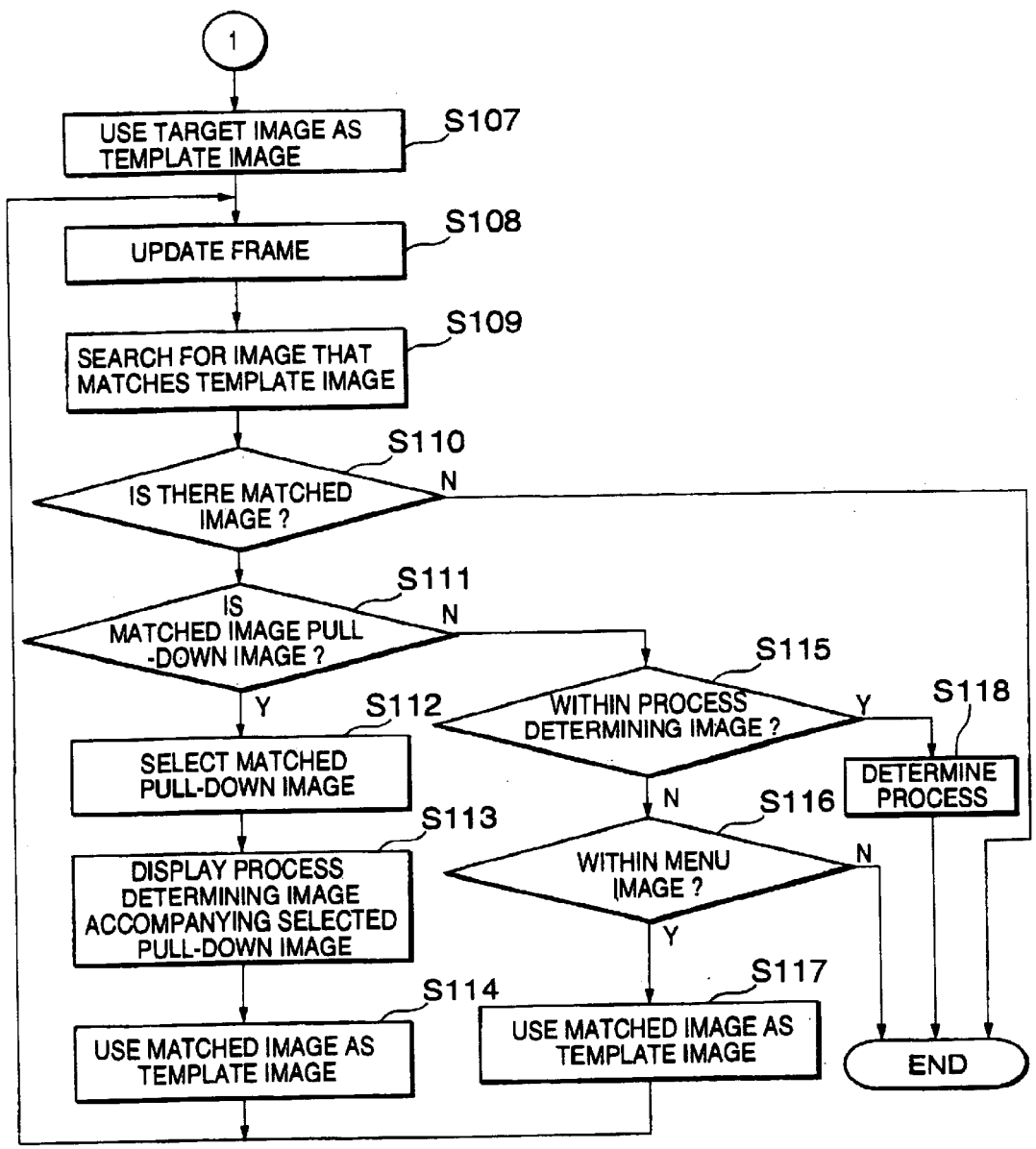
FIG. 5 is a flow chart showing a processing procedure of Embodiment 1.

FIG. 4 and FIG. 5 show the procedure for processing by the image processor 2 to enable such an operation.

First, with reference to FIG. 4, the difference value detector 107 updates the mirrored moving image to that of the next frame and when the combined image generated by the superimposing image generator 106 is thereby updated (step S101) image features of the mirrored moving image included in the preceding and following combined images to be updated are compared and the difference value is calculated (step S102). The difference value calculated here is a value expressing one movement of the operator's hand in the area in which the menu image is displayed. The difference values calculated are recorded in the main memory 11 and cumulatively added for a certain period of time (step S103). The reason that difference values are cumulatively added is that the operator's will about the operation instruction is detected by the image processor 2 based on a plurality of movements of the operator's hand. If the operator's will about the operation instruction can be checked according to the amount of one time movement of the hand, cumulative addition need not always be performed.

The difference value detector 107 sends the difference value (cumulative sum) to the object controller 105.

The object controller 105 determines the color of the menu image according to the difference value (cumulative sum) received from the difference value detector 107 (step S104). For example, a plurality of colors of the menu image is provided and the color is changed one by one every time a movement of the hand is detected. It is also possible to change the color from transparent to semitransparent, opaque, etc. Or the actual difference value (cumulative sum) is compared with a predetermined threshold (step S105) and if the cumulative sum is smaller than the threshold (step S105: N), the routine goes back to step S101 assuming that it is not sufficient to determine that "menu" of the menu screen has been selected.

When the cumulative sum exceeds the threshold (step S105: Y), the object controller 105 determines that "menu" of the menu screen has been selected, shows a pull-down image and reports it to the difference value detector 107 (step S106).

Thus, when the cumulative sum of the movement of the operator's hand detected in the area in which the menu image is displayed exceeds the threshold, the object controller 105 detects that "menu" of the menu image has been selected and shows the pull-down image. The color of the menu image changes according to the cumulative sum of the amount of movement of the hand, and therefore the operator can know a rough amount of additional movement of the hand required to select "menu".

Furthermore, since the display device 3 shows a mirrored moving image, the operator can perform the above-described operation in much the same way the operator looks in a mirror, providing a man-machine interface easy-to-operate for the operator.

Thus, according to FIG. 5, when it is detected that "menu" on the menu screen has been selected, that is, the difference value (cumulative sum) has exceeded the threshold, the difference value detector 107 stores the image of the operator's hand (target) at that time as a template image (step S107).

When the frame is updated and the menu image is thereby replaced by the pull-down image in its subordinate layer and a combined image is shown (step S108), a search is started for the location of the image of the operator's hand in the new combined image. That is, the difference value detector 107 searches for an image that matches the template image from the combined image (step S109).

More specifically, the difference value detector 107 divides the combined image into areas in the same size as that of the template image and searches for the image most resembling the template image from among the images in the respective areas after the division. The image most resembling the template image in the area is, for example, when the sum total of absolute values (or squares) of differences between pixels of the images compared can be expressed as distances, an image whose distance from the template image is a minimum.

When a matched image is found (step S110: Y), it is determined whether the matched image is a pull-down image or not (step S111). If the matched image is a pull-down image (step S111: Y), the area of the pull-down image is detected from "select1", "select2" or "select3" (step S112). The detected pull-down image becomes the pull-down image indicated and selected by the operator. Information on the selected pull-down image is reported from the difference value detector 107 to the object controller 105.

The object controller 105 reads a process determining image accompanying the selected pull-down image from the object data storage device 103 and generates an object image to which this process determining image is attached (step S113).

In this way, the display device 3 shows how the menus are selected one after another by the operator.

In the example in FIG. 7, the pull-down image of "select2" is selected from the menu image at the top layer and the process determining images ("process 21", "process 22", "process 23" and "process 24") accompanying the pull-down image of "select2" are displayed.

The template image is replaced by a new one for every frame.

That is, the difference value detector 107 discards the template image used for the preceding frame and stores the above-described matched image (image of the operator's hand used to select the pull-down image) as a new template image (step S114). Then, the routine returns to step S108 to specify any one of the process determining images ("process 21", "process 22", "process 23" and "process 24") as shown above.

In step S111, when the matched image is outside the area of the pull-down image but is any one of the process determining images within the process determining image area (step S111: N, S115: Y), the process determining image is assumed to have been selected and the content of the process linked thereto is determined, that is, the program is made executable and the process using the menu image is finished (step S118).

When the matched image is outside the areas of the pull-down image and the process determining image but within the menu image area (step S111: N, S115: N, S116: Y), this means that the operator attempts to select another pull-down image, and therefore the routine discards the template image, stores the matched image as a new template image and returns to step S108 (step S117).

In step S110, when no matched image to be compared is found (step S110: N) or when a matched image is found but is an image outside the area of the menu image, the process by the menu image is finished at that time (step S111: N, S115: N, S116: N).

By carrying out processing according to the menu image in the above procedure, the operator can easily select the process with a desired content while watching the own mirrored moving image shown on the screen of the display device 3. Furthermore, the operator can enter instructions while checking the own behavior on the screen at any time, which prevents the operator from averting his/her eyes from the display device 3 as in the case of using an input device such as a keyboard.

Embodiment 2

The image processing system according to this embodiment links an object image to a program that causes the main CPU 10 to execute an event to be subjected to image processing so that processing of the relevant event is executed according to the action of the operator within the mirrored moving image on the object image.

As an example of an object image to be superimposed on the mirrored moving image, this embodiment shows a case of using an image of a matchstick and an image of a flame expressing that the matchstick ignites and burns.

As a premise, the image of the matchstick, which is the object image, is linked beforehand to a program to display an ignition animation indicating that the matchstick has ignited on the display device 3. Then, when the operator in the mirrored moving image behaves as if he/she struck the image of the match within the combined image, the ignition animation is designed to appear in the ignition part of the image of the matchstick. The image of the flame is displayed when the operator strikes the image of the matchstick.

The image of the flame can be generated using a technique of, for example, recursive texture drawing.

The "recursive texture drawing" refers to a drawing technique of referencing an image of an object rendered by texture mapping as texture of another image and carrying out texture mapping recursively. "Texture mapping" is a technique of rendering an image of an object to enhance the texture of the image by pasting bitmap data of the texture to the surface of the object and can be implemented by also using the frame memory 15 as a texture memory. When carrying out such recursive texture drawing, gouraud shading is applied to a polygon on which the texture is drawn, that is, the brightness at vertices of the polygon is calculated and the brightness inside the polygon is calculated by interpolating the brightness of each vertex (this technique is called "gouraud shading drawing").

Figure 10:
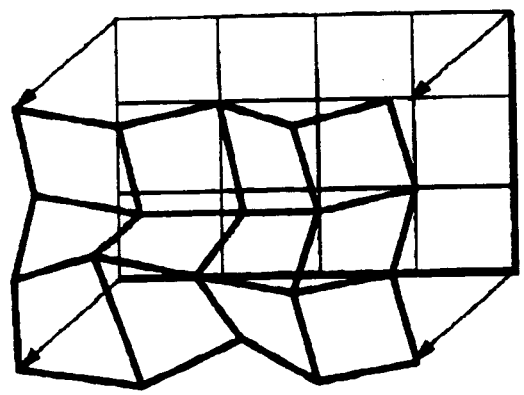
FIG. 10 is a view illustrating a drawing using a recursive texture.

To express the flame image, the positions of vertices of a mesh which is the source of the flame image are shifted using random numbers as shown in FIG. 10 and the positions of new vertices are determined. The brightness at the vertices is also determined based on random numbers. The positions of the vertices and brightness at the vertices are determined every time the frame is updated. Every unit of the mesh which is the source of the flame image becomes a polygon.

On each polygon, the image that becomes the basis of the flame drawn in the frame memory 15 is formed through the above-described recursive texture drawing and the above-described gouraud shading is applied based on the brightness at each vertex of the polygon. This makes it possible to express a rising air current caused by the flame, shimmering, attenuation of the flame in a more realistic way.

Suppose the image processor 2 shows a combined image with the image of a matchstick superimposed on the mirrored moving image of the operator on the display device 3. Here, suppose the target is the operator's hand. By detecting the amount of movement of the hand in the area in which the image of the matchstick is displayed, the program linked to the image of the matchstick is executed and the ignition animation is displayed on the display device 3.

Figure 8:
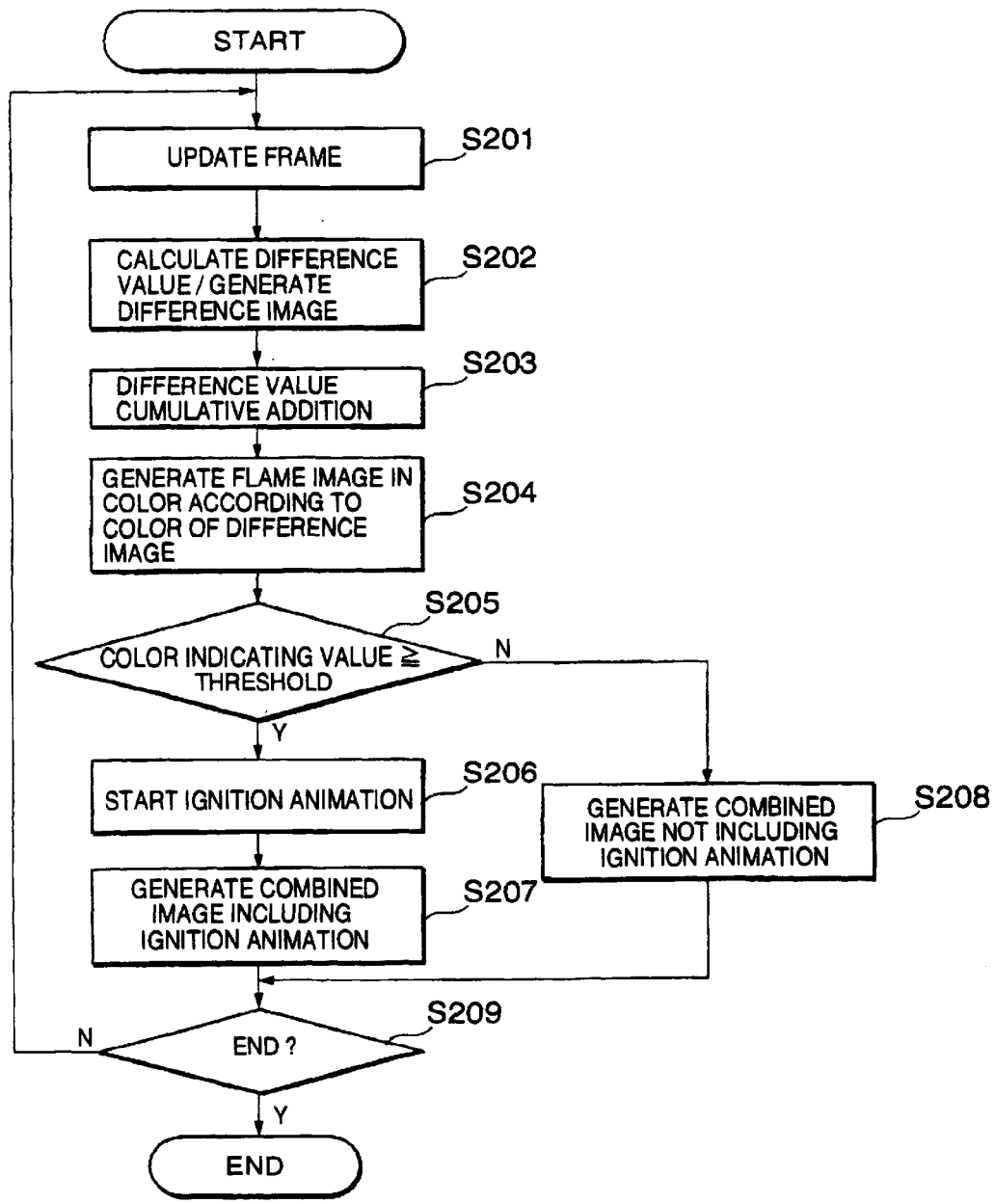
FIG. 8 is a flow chart showing a processing procedure of Embodiment 2.
Figure 9:
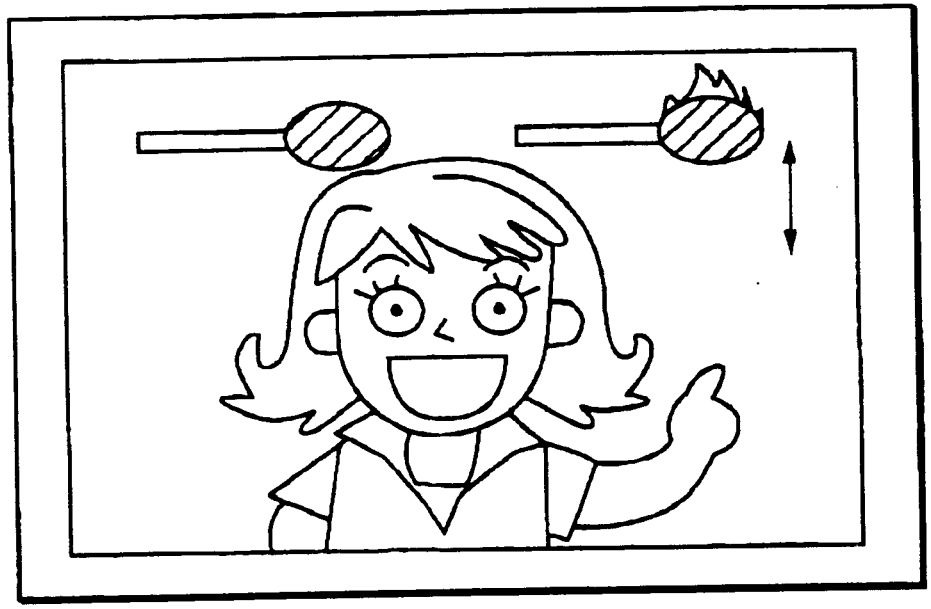
FIG. 9 illustrates a combined image according to Embodiment 2.

FIG. 8 shows the processing procedure using the image processor 2 to realize such an operation.

When the mirrored moving image is updated to the image of the next frame and the combined image generated by the superimposing image generator 106 is thereby updated (step S201), the difference value detector 107 compares image features of the mirrored moving images included in the combined images before and after the updating, calculates a difference value of the image in the ignition section of the image of the matchstick and generates a difference image of the ignition section of the image of the matchstick (step S202). The difference value calculated here is a value that quantitatively expresses the movement of the hand in the ignition section of the image of the matchstick. The difference value generated is an image made up of the images of the hand before and after moving the hand in the ignition section of the image of the matchstick.

The calculated difference value is recorded in the main memory 11 and cumulatively added for a certain period of time (step S203).

The difference value detector 107 sends the cumulative sum, which is the cumulative sum of the difference images and difference values to the object controller 105.

The object controller 105 determines the color of the difference image according to the cumulative sum received from the difference value detector 107 and generates a flame image based on this difference image (step S204). The flame image is generated, for example, by dividing the difference image into meshes and using the aforementioned recursive texture based on these meshes. The color of the flame image is determined according to the color of the difference image. The flame image generated is superimposed on the ignition section of the image of the matchstick.

In this way, the flame image with the color according to the amount of movement of the hand added is displayed in the area showing the movement of the hand in the ignition section of the image of the matchstick.

Determining the color of the flame image according to the cumulative sum of difference values makes it possible, for example, to express how the color of the flame image displayed in the ignition section of the matchstick gradually changes according to the amount of movement of the hand.

Then, the object controller 105 compares the value indicating the color of the flame image with a predetermined threshold (step S205). For example, if the color of the flame image is expressed by R, G and B values, the sum of their respective values can be used.

When the value indicating the color is equal to or greater than the threshold (step S205: Y), the object controller 105 determines to execute the program that displays the ignition animation indicating that the match has ignited (step S206).

That is, whether or not to start the ignition animation is determined according to the color of the flame image. For example, when the color of the flame image changes from red to yellow according to the amount of movement of the hand, the ignition animation starts when the flame images turns yellow. The operator can know a rough amount of additional movement of the hand required to start the ignition animation.

The superimposing image generator 106 generates a combined image superimposing the ignition animation on the object image including the matchstick image and flame image, on the mirrored moving image obtained from the video camera 1 (step S207). The ignition animation is displayed in the ignition section of the matchstick image.

When the value indicating the color is smaller than the threshold (step S205: N), the object controller 105 sends the object image superimposing the flame image on the matchstick image to the superimposing image generator 106. The superimposing image generator 106 generates a combined image by superimposing this object image on the mirrored moving image obtained from the video camera 1 (step S208).

Then, if, for example, an instruction for finishing the processing is received from the operation device 35, the processing is finished (step S209: Y). If no instruction for finishing the processing is received (step S209: N), the routine returns to step S201 and the display controller 108 displays the combined image generated in step S207 or step S208 on the display device 3.

As shown above, the system executes the process of determining whether or not to execute the program for displaying the ignition animation linked to the matchstick image according to how much the operator moves his/her hand in the ignition section of the matchstick image.

Since the operator can perform operations for executing various events while watching the mirrored moving image, it is possible to perform input operations for executing processes more easily than conventional operations using input devices such as a keyboard and mouse.

Embodiment 3

Figure 13A:
FIG. 13 illustrates a combined image according to Embodiment 3.

Another embodiment will now be explained. As a premise, suppose the image processor 2 shows a combined image with a cursor (pointer) image, which is an example of an object image, superimposed on the mirrored moving image of the operator on the display device 3 as shown in FIG. 13(a). Also suppose a plurality of targets such as the hand, eyes, mouth of the operator are included in the mirrored moving image.

Here, a case will be explained whereby focusing on the movement of the operator's hand from the plurality of these targets, the cursor image is expressed in such a way as to follow this movement of the hand.

As shown in FIG. 13(a), the cursor image is an image like a face with an emphasis put on the eyes, which allows the eyes to be oriented toward the target. Furthermore, the cursor image moves following the movement of the target. That is, when the cursor image is distant from the target, the cursor image moves toward the target and when the cursor image catches the target, the cursor image follows the movement of the target.

Figure 11:
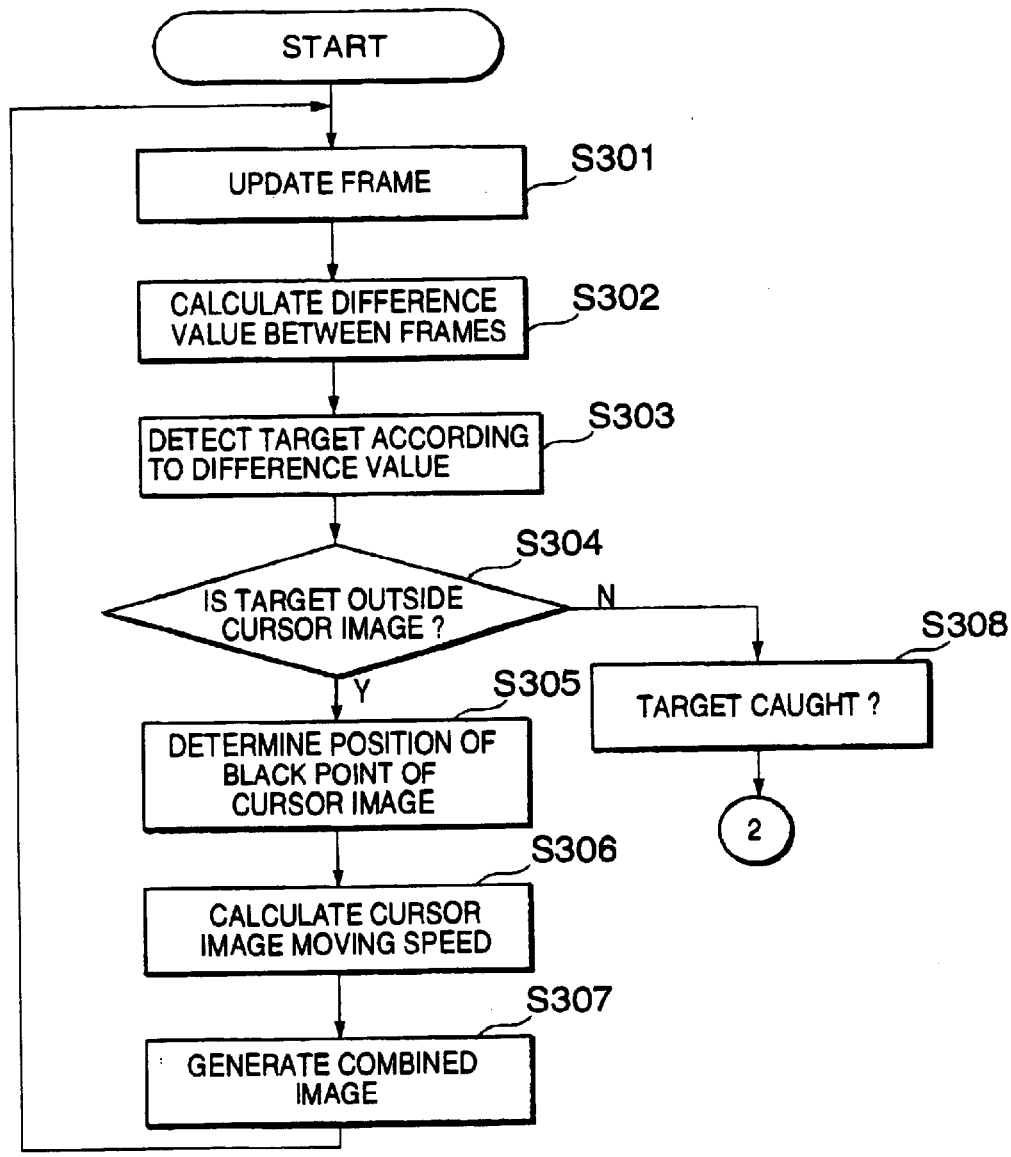
FIG. 11 is a flow chart showing a processing procedure of Embodiment 3.
Figure 12:
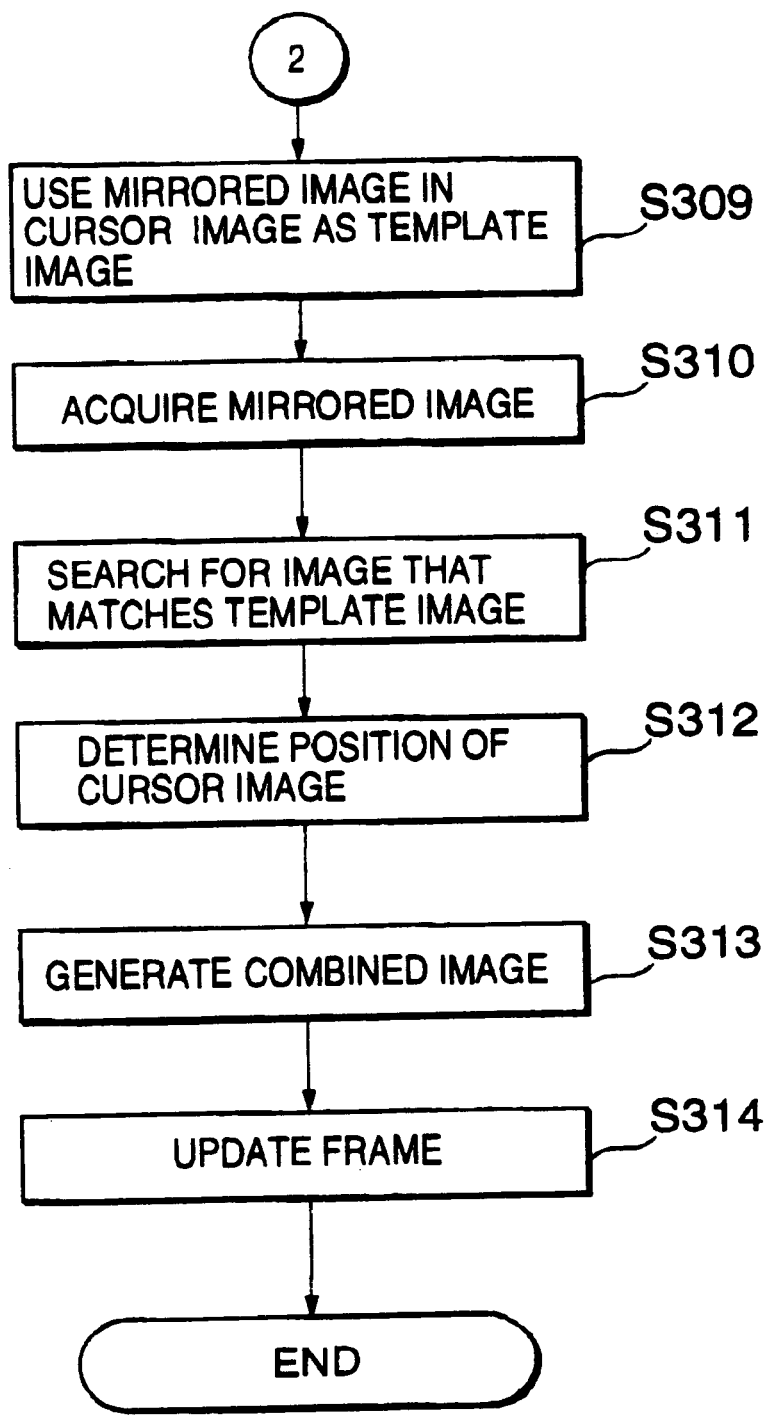
FIG. 12 is a flow chart showing a processing procedure of Embodiment 3.

FIG. 11 and FIG. 12 show the processing procedure using the image processor 2 to realize such an operation.

According to FIG. 11, when the mirrored moving image is updated to the image of the next frame and the combined image generated by the superimposing image generator 106 is thereby updated (step S301), the difference value detector 107 compares image features of the mirrored moving image included in the combined images before and after the updating and calculates the difference value thereof (step S302). The difference value calculated here is a value quantifying the movements of the hands, eyes, mouth, etc. of the operator, which become candidates of the target in the mirrored moving image.

The difference value detector 107 sends the difference value of each target to the object controller 105.

The object controller 105 detects one target based on the difference value of each target sent from the difference value detector 107 (step S303). For example, the object controller 105 detects a target whose difference value reaches a maximum. In this example, suppose the operator's hand is detected as the target.

Upon detecting the target, the object controller 105 determines how the cursor image is displayed according to the target.

First, the object controller 105 determines whether the target in the combined image updated in step S301 is outside the cursor image or not (step S304). If the target is within the cursor image (step S304: N), the object controller 105 determines that the cursor image has caught the target (step S308).

If the target is outside the cursor image (step S304: Y), the object controller 105 determines that the cursor image has not caught the target and carries out processing for determining how the cursor image is displayed. That is, the object controller 105 generates a cursor image so that the eyes in the cursor image are oriented toward the target.

Furthermore, the object controller 105 determines the speed at which the cursor image moves toward the target according to the distance between the cursor image and target (step S306). This speed is adjusted to increase as the cursor image moves away from the target. This makes it possible to obtain an image in which the cursor moves toward the target faster as the cursor image stays farther from the target.

The superimposing image generator 106 superimposes such a cursor image on the mirrored moving image of the next frame and thereby generates a combined image as shown in FIG. 13A (step S307). Then, the routine goes back to step S301 and performs the same operation for the combined image generated.

The routine carries out the operations of step S301 to S307 until the cursor image catches the target, that is, until it is determined in step S304 that the target is within the cursor image.

Such operations can provide an image as shown in FIG. 13 (a) in which the eyes in the cursor image are oriented toward the target (hand) and the cursor image chases after the target.

Then, according to FIG. 12, when the cursor image catches the target, the difference value detector 107 stores the image of the target at that time as a template image (step S309). For example, the difference value detector 107 stores the section of the mirrored moving image that overlaps with the cursor image as the template image.

Then, the difference value detector 107 acquires the mirrored moving image of the next frame from the image inverter 102 (step S310). The difference value detector 107 searches for the position of an image that matches the stored template image from among the acquired mirrored moving images (step S311).

More specifically, the difference value detector 107 divides the acquired mirrored moving image into areas of the same size as the template image and searches for an image in the area most resembling the template image from among the images in the respective divided areas. Upon detecting the matched image as a result of the search, the difference value detector 107 reports the position of the detected image to the object controller 105.

The object controller 105 determines the position reported from the difference value detector 107 as the position of the cursor image for the next combined image (step S312).

Figure 13B:
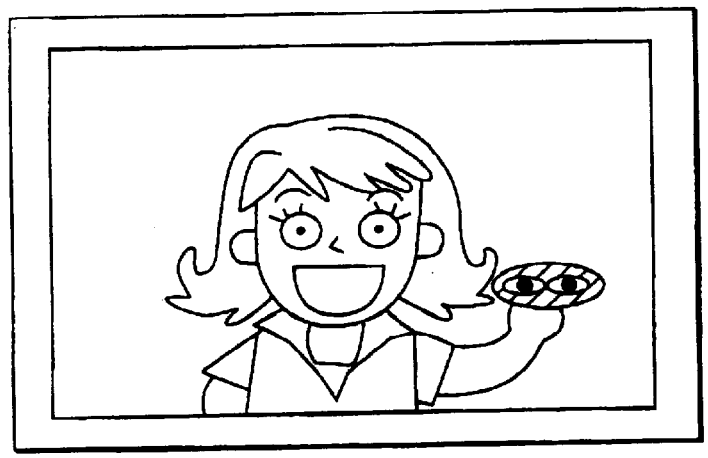

The superimposing image generator 106 superimposes the cursor image at the position determined in step S312 by the object controller 105 on the same mirrored moving image as the mirrored moving image acquired in step S310 by the difference value detector 107 and thereby generates a combined image as shown in FIG. 13B (step S313). Then, the frame is updated and the display controller 108 displays the combined image generated on the display device 3 (step S314).

Figure 13C:
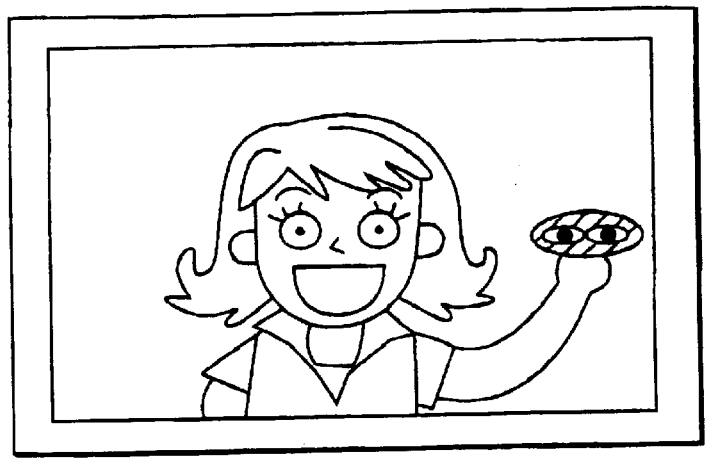

Repeating the above-described operations after the target is caught (step S309 to step S314) obtains an image in which the cursor image follows the target. That is, when the cursor image catches the target (hand) as shown in FIG. 13B, the cursor image is displayed thereafter following the target wherever the target moves. Even when the operator extends the hand as shown in FIG. 13B to FIG. 13C, the cursor image is displayed at the tip of the extended hand of the operator together with the movement of the hand recognized as the target.

Use of the cursor image allows the operator to know at a glance which position of the part of the own body is functioning as the cursor when selecting a process from the menu image as shown in Embodiment 1, for example.

Furthermore, if, for example, the trace of the movement of the cursor image is set to be kept and displayed, it is possible to show the trace of the movement of the target on the display device 3. This makes it possible to show, for example, pictures and characters, etc. drawn in the space on the display device 3.

As is clear from the foregoing explanations, when the operator needs to enter data, etc. the present invention allows the operator to enter or select the data easily using the mirrored moving image while watching the combined image displayed on the display device, and can thereby provide a user-friendly input interface without the need to get accustomed thereto.

Various embodiments and changes may be made thereunto without departing from the broad spirit and scope of the invention. The above-described embodiment intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

What is claimed is:

1. An image processor comprising:
    image capturing means for capturing a mirrored moving image in a time series, said mirrored moving image at least partially including a moving target;
    detecting means for detecting said target and a movement component thereof by detecting image features between a mirrored moving image at an actual time point and an immediately preceding mirrored moving image;
    image generating means for generating an object image representing a predetermined object in such a way as to change according to said movement component of the target detected by said detecting means;
    controlling means for combining said object image generated by the image generating means with said captured mirrored moving image and for displaying said combined image on a predetermined display device; and
    means for comparing a combined image obtained by combining said object image generated by said image generating means and said mirrored moving image at the actual time point with a template image, which is an image including only a part of said target included in said immediately preceding mirrored moving image, for detecting a part of said combined image whose image features most resemble said template image, and for making preparations for executing required processing based on the object image when the image of said part of said combined image includes said object image.

2. The image processor according to claim 1, wherein said image generating means is operable to generate said object image in such a way as to follow said movement of said detected target.

3. The image processor according to claim 1, further comprising means for making preparations for executing required processing based on said generated object image according to said movement component of said target.

4. The image processor according to claim 1, further comprising means for executing predetermined processing which is linked to said object image when said movement component of said target detected by said detecting means satisfies predetermined conditions.

5. An image processor comprising:
    image capturing means for capturing a mirrored moving image in a time series, said mirrored moving image at least partially including a moving target;
    detecting means for detecting said target and a movement component thereof by detecting image features between a mirrored moving image at an actual time point and an immediately preceding mirrored moving image;

image generating means for generating an object image representing a predetermined object in such a way as to change according to said movement component of the target detected by said detecting means; and controlling means for combining said object image generated by the image generating means with said captured mirrored moving image and for displaying said combined image on a predetermined display device, wherein:

said mirrored moving image includes a plurality of said targets, said detecting means is operable to detect said movement components of said plurality of targets and to detect one target based on said detected movement components of said plurality of targets, and said image generating means is operable to change said object image according to said movement component of said one target detected by said detecting means.

6. An image processing method, comprising:

capturing a mirrored moving image at least partially including a moving target in an image processor;

generating an object image representing a predetermined object using said image processor according to a movement of said target included in said captured mirrored moving image;

combining said generated object image with said captured mirrored moving image and displaying said combined image on a predetermined display device;

comparing a combined image obtained by combining said generated object image with said captured mirrored moving image at the actual time point with a template image, which is an image including only a part of said target included in said immediately preceding captured mirrored moving image;

detecting a part of said combined image whose image features most resemble said template image; and making preparations for executing required processing based on the generated object image when the image of said part of said combined image includes said generated object image.

7. An image processing method as claimed in claim 6 wherein said mirrored moving image includes a plurality of said targets, said method further comprising detecting movement components of said plurality of targets;

detecting one target based on said detected movement components of said plurality of targets; and changing said object image according to said movement component of said one detected target.

8. A recording medium containing a computer program for causing a computer with a display device connected thereto to execute steps comprising:

capturing a mirrored moving image at least partially including a moving target;

generating an object image representing a predetermined object according to movement of said target included in said captured mirrored moving image;

combining said object image with said captured mirrored moving image and displaying said combined image on said display device; and comparing a combined image obtained by combining said generated object image with said captured mirrored moving image at the actual time point with a template image, which is an image including only a part of said target included in said immediately preceding captured mirrored moving image;

detecting a part of said combined image whose image features most resemble said template image; and making preparations for executing required processing based on the generated object image when the image of said part of said combined image includes said generated object image.

9. A recording medium as claimed in claim 8 wherein said mirrored moving image includes a plurality of said targets, said method further comprising detecting movement components of said plurality of targets;

detecting one target based on said detected movement components of said plurality of targets; and changing said object image according to said movement component of said one detected target.

10. A semiconductor device for causing a computer with a display device connected thereto to perform functions comprising:

capturing a mirrored moving image at least partially including a moving target;

generating an object image representing a predetermined object according to movement of the target included in said captured mirrored moving image; and combining said object image with said captured mirrored moving image and displaying the combined image on said display device; and comparing a combined image obtained by combining said generated object image with said captured mirrored moving image at the actual time point with a template image, which is an image including only a part of said target included in said immediately preceding captured mirrored moving image;

detecting a part of said combined image whose image features most resemble said template image; and making preparations for executing required processing based on the generated object image when the image of said part of said combined image includes said generated object image.

11. A semiconductor device as claimed in claim 10 wherein said mirrored moving image includes a plurality of said targets, and wherein said semiconductor device is operable to cause the computer to perform further functions including:

detecting movement components of said plurality of targets;

detecting one target based on said detected movement components of said plurality of targets; and changing said object image according to said movement component of said one detected target.

12. A graphics processor, comprising:

an image input device operable to capture image frames from a camera in a time series such that said image frames include at least some features of a user of said graphics processor;

an image inverter operable to produce mirrored image frames from said captured image frames, one or more of said features of said mirrored image frames being a target including only a part of the features of the user;

an object image generator operable to produce object frames, said object frames representing one or more predetermined objects for display;

a superimposing image generator operable to combine said mirrored image frames and said object image frames to produce combined image frames;

a detector operable to determine movement of said target from frame to frame and to quantify said movement; and a controller operable to cause adjustments to said object frames in response to said quantification of said movement of said target and for displaying said combined image frames on a display device and to compare said combined image frame with said mirrored image frame at the actual time point with a template image, which is an image including only a part of said target included in a mirrored image frame preceding said mirrored image frame at the actual time point, to detect a part of said combined image frame whose image features most resemble said template image, and to make preparations for executing required processing based on the object image when the image of said part of said combined image includes said object image.

13. The graphics processor of claim 12, wherein said objects include menu indicia; and said controller is operable to determine whether said movement of said target indicates a desire by said user to select said menu indicia based on said quantification of said movement of said target by said detector, and to execute one or more further graphics processes based on said menu selection made by said user.

14. The graphics processor of claim 12, wherein said objects include a cursor; and said controller is operable to determine whether said movement of said target indicates a desire by said user to at least one of acquire and manipulate said cursor based on said quantification of said movement of said target by said detector, and to execute one or more further graphics processes based on manipulation of said cursor by said user.

15. The graphics processor of claim 14, wherein said target includes said cursor when said user has acquired said cursor and said detector is further operable to determine movement of said target with said cursor.

16. A graphics processor as claimed in claim 12 wherein said mirrored image frames include a plurality of said targets, and wherein said controller is further operable to detect movement components of said plurality of targets, to detect one target based on said detected movement components of said plurality of targets, and to change said object image according to said movement component of said one detected target.

17. A method, comprising:

capturing image frames from a camera in a time series such that said image frames include at least some features of a user of a graphics processor;

producing mirrored image frames from said captured image frames, one or more of said features of said mirrored image frames being a target including only a part of the features of the user;

producing object frames, said object frames representing one or more predetermined objects for display;

superimposing said mirrored image frames with said object frames to produce combined image frames;

determining movement of said target from frame to frame and quantifying said movement;

adjusting said object frames in response to said quantification of said movement of said target; and displaying said combined image frames on a display device; and comparing a combined image frame obtained by combining said object frame and said mirrored image frame at the actual time point with a template image, which is an image including only a part of said target included in said immediately preceding mirrored image frame;

detecting a part of said combined image frame whose image features most resemble said template image; and making preparations for executing required processing based on the object frame when the image of said part of said combined image frame includes said object frame.

18. The method of claim 17, wherein said objects include menu indicia; and said method further includes determining whether said movement of said target indicates a desire by said user to select said menu indicia based on said quantification of said movement of said target, and executing one or more further graphics processes based on said menu selection made by said user.

19. The method of claim 17, wherein said objects include a cursor; and said method further includes determining whether said movement of said target indicates a desire by said user to at least one of acquire and manipulate said cursor based on said quantification of said movement of said target, and executing one or more further graphics processes based on manipulation of said cursor by said user.

20. The method of claim 19, wherein said target includes said cursor when said user has acquired said cursor, said cursor moving with said target when said user has acquired said cursor.

21. A method as claimed in claim 17 wherein said mirrored image frames include a plurality of said targets, said method further comprising detecting movement components of said plurality of targets;

detecting one target based on said detected movement components of said plurality of targets; and changing said object image according to said movement component of said one detected target.

* * * * *